UNITED STATES PATENT OFFICE.

WILLIAM KIRRAGE, OF LONDON, ENGLAND.

IMPROVEMENT IN THE MANUFACTURE OF ARTIFICIAL STONE.

Specification forming part of Letters Patent No. 55,969, dated June 26, 1866.

*To all whom it may concern:*

Be it known that I, WILLIAM KIRRAGE, of London, in the United Kingdom of Great Britain and Ireland, have invented an Improvement in the Manufacture of Artificial Stone for Building and other Purposes; and I do hereby declare that the following is a full and exact description of the same.

I use silica, sand, gravel, or any other fit and proper hard and unchangeable matters with a portion of cement. Sulphate of iron and water are then added in a sufficient quantity to bind and corrode the silicia; or any other sulphate or acid may be used containing the properties of corroding the mass, which is the object this invention is intended to obtain. This composition is intended to form blocks or masses of artificial stone of any shape, to be used in the construction of buildings in the place of bricks or stone, or in union with either or both of them, as occasion may require. The molds require to be made strong to resist the pressure while filling. In the absence of hydraulic or other machines small hand-rammers may be used. In filling care must be taken that the mixture is neither too dry nor too damp for the process of ramming, as in the former case the stone will powder, and in the latter case the excess of moisture will show itself on the surface, and in either the solidification will be less perfect; and although I prefer Portland or other cements in the construction of these blocks, I sometimes use ground lime, such as blue or gray lias, "Dorking," or other limes, with sulphate of iron, in which case I invariably use the water in a hot or boiling state, taking care not to mix more material at one time than will fill the molds ready for use, as the setting or hardening process commences immediately, and is fit to take out of the molds in ten minutes after filling them.

I make my artificial bricks or tiles and stone from silica, sand, gravel, or other similar matters, such as brick and pottery, and similar materials in the shape of waste, which should be ground, burnt clay or ground chalk, slag, or the materials obtained from opening metal mines, or other waste materials containing silica and being of a hard character, may also be used in connection with a portion of cement, which I incorporate with the other materials, all being ground or mixed together in a suitable pug or other mixing mill.

I next proceed to treat the mixed material with a chemical agent which acts upon the silica and corrodes it, so as to produce a binding effect and a hardening of the mass. I prefer to use a solution of sulphate of iron; but solutions of metallic sulphates, such as will also act upon the silica, and muriates of some of the metals would also produce a similar result, such as alum, slate, or schist, and the mother liquor in the manufacture of alum, fluoric acid, acetate of iron, pyrolignate of iron, oxides, corbonates, and muriates of iron, iron dissolved in sal-ammoniac, rice or rice-water, and gum-galbanum and gum-ammoniacum dissolved in spirit; but I prefer to use sulphate of iron as being efficacious and most economical, and as coloring-matters bullocks' blood, coal-pitch, litharge, rice, and rice-water, as well as the several vegetable and mineral colors.

The cement I propose to use is Portland cement. The proportions I find best to answer the purpose are, one pound of cement to form eight to twelve pounds of the silica contained in the materials above named. The materials will be found to vary somewhat in quality; but a competent workman will easily ascertain how much cement must be added to produce a compound that is hard and durable. Of the sulphate of iron, which I use by preference, I take the common crystals and dissolve them and mix them in water, in the proportions of half an ounce of sulphate of iron to every gallon of water, for the making of bricks or blocks for all common building purposes. These proportions will answer well. But in making coping-sills for windows, sinks, landings, chimney-tops, and all heavy work, the proportions of sulphate of iron should be increased, and will produce a stronger and harder compound to meet the strength required, particularly in the case of heavy landings and large columns to carry weights.

If hydraulic or blue or gray lias lime is used instead of cement, I then take six or eight pounds of silica or other matter to one pound of either of the above limes, with the same quantity of sulphate as with the cement, only in this case the mixture of sulphate must be used hot, as hereinafter described. If any of the lower quality of lime be used, it will require to every four or five pounds of silica or other matter one pound of such lime, and the sulphate mixture should also be used hot. The ground material containing the silica should be well mixed in a pug or other mill in about the proportions above stated. I then add the solution of a metallic sulphate, preferring the sulphate of iron, in the proportion above mentioned, using the solution cold with the Portland cement or other similar cements; but with limes the solution should be used hot. So much of the solution should be added to the materials in the mill as will make it bind together and make it slightly plastic, but not too much so. It is then fit for being compressed into molds in the usual way of molding. As soon as the pug-mill or other apparatus has thoroughly incorporated the mixture it is advisable to transfer it to a molding-machine, either worked by hand or steam-power, and so the bricks or other forms or articles may be molded and pressed as soon as possible. A hand-press or ram may be used, or the molds may be pressed down by hand. In the case of making copings, columns, sills, sinks, and other heavy work the molds must be well filled, and every corner and projection must be rammed down in a sound and careful manner. In the manufacture of bricks and tiles from clay and plastic materials, to aid and economize perfect and uniform combustion, burning, and hardening, and a superior form of article, I use vegetable and mineral oils, petroleum, and the ordinary coal and gas tars. These, or one of them, are mixed with the clays, brick, earths, or other plastic material in the pug-mills or machinery used in the manufacture of bricks, tiles, &c.

Having now described the nature of my invention and in what manner the same is to be performed, I do not claim the mixing of cements and silica, nor the mixing of limes and silicas; but

What I do claim is—

1. The manufacture of artificial stone, bricks, and tiles, or other hard material, by mixing and using the sulphate of iron or other similar metallic sulphates, or other similar mixtures of acids, with metallic bases and the several materials hereinbefore described, in combination with cements and silica and limes and silica contained in the materials such as I have mentioned, for the purpose hereinbefore described.

2. The application of the coloring-matters before named, in combination with the silica and other materials.

3. In the manufacture of bricks and tiles from plastic materials, the application of the materials specified for the purpose of effecting a more perfect combustion, burning, and hardening, thus producing a superior form of article.

In testimony whereof I have signed my name to this specification in the presence of two subscribing witnesses.

WILLIAM KIRRAGE.

Witnesses:
G. F. WARREN,
JOHN DEAN.